United States Patent
Gilloon et al.

(10) Patent No.: US 10,512,986 B2
(45) Date of Patent: Dec. 24, 2019

(54) LASER WELDING PROCESS

(71) Applicant: FORD GLOBAL TECHNOLOGIES, LLC, Dearborn, MI (US)

(72) Inventors: Matthew Gilloon, Birmingham, MI (US); Arnon Wexler, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 433 days.

(21) Appl. No.: 15/426,265

(22) Filed: Feb. 7, 2017

(65) Prior Publication Data

US 2017/0232554 A1  Aug. 17, 2017

Related U.S. Application Data

(60) Provisional application No. 62/295,312, filed on Feb. 15, 2016.

(51) Int. Cl.
*B23K 26/322* (2014.01)
*B23K 26/244* (2014.01)
*B23K 26/60* (2014.01)
*B23K 101/34* (2006.01)

(52) U.S. Cl.
CPC .......... *B23K 26/322* (2013.01); *B23K 26/244* (2015.10); *B23K 26/60* (2015.10); *B23K 2101/34* (2018.08)

(58) Field of Classification Search
CPC .... B23K 26/244; B23K 26/28; B23K 26/322; B23K 26/60; B23K 2101/34
See application file for complete search history.

(56) References Cited

U.S. PATENT DOCUMENTS

| | | | | |
|---|---|---|---|---|
| 7,939,779 | B2* | 5/2011 | Zauner | B23K 26/10 219/121.61 |
| 8,841,577 | B2* | 9/2014 | Takahashi | B23K 33/00 219/121.64 |
| 9,012,804 | B2* | 4/2015 | Takahashi | B23K 33/00 219/121.64 |
| 2012/0160815 | A1* | 6/2012 | Hayashimoto | B23K 26/28 219/121.64 |
| 2013/0087540 | A1* | 4/2013 | Gu | B23K 26/32 219/121.64 |

FOREIGN PATENT DOCUMENTS

CA     2209804     8/1997

\* cited by examiner

*Primary Examiner* — Geoffrey S Evans
(74) *Attorney, Agent, or Firm* — Vincent Mastrogiacomo; Brooks Kushman P.C.

(57) ABSTRACT

A method is disclosed for welding a first part and second part together. A spacer bead is first formed on the first part by directing a laser beam on one side of the first part. The second part is then assembled to the one side of the first part. The second part is then welded to the first part by directing a second laser beam in a partially circular pattern adjacent the spacer bead. An end portion of the weld terminates radially inside the partially circular pattern.

5 Claims, 6 Drawing Sheets

LASER WELDING PROCESS

CROSS-REFERENCE TO RELATED APPLICATIONS

This application claims the benefit of U.S. provision application Ser. No. 62/295,312 filed Feb. 15, 2016, the disclosure of which is hereby incorporated in its entirety by reference herein.

TECHNICAL FIELD

This disclosure relates to laser welding processes for welding parts having an anti-corrosion layer.

BACKGROUND

A wide variety of welding processes are used to join sheet metal panels or other types of parts together. Laser welding is one type of welding process that offers advantages such as the ability to weld from one side without requiring access to the back side of the parts to be welded as is required for spot or resistance welding. Laser welding also may be performed without a filler wire like manual inert gas (MIG) welding or tungsten inert gas (TIG) welding. Laser welding eliminates maintenance of weld tips, electrodes and torches.

Welding parts that are coated with an anticorrosion layer of zinc or a zinc based coating composition creates problems for laser welding processes because the coating has a lower melting point than a steel substrate panel. When the coating is heated during a laser welding operation, the coating vaporizes creating smoke plumes and gaseous emissions. Plumes of smoke are removed from the path of the laser by blowing air across the welding area. Gaseous emissions from vaporizing the coating applied to an area of two parts that are assembled together in a face-to-face relationship must be permitted to escape from between the panels or the gaseous emissions may bubble up through the molten laser weld and create porosity in the weld.

It has been proposed to provide a series of protuberances, or bumps, between panels through the use of a "humping effect" wherein a laser is used to heat the inner surface of one of two panels that are to be joined together. After the panels are placed face-to-face with the protuberances between the panels, a laser weld is formed through one side of the assembly while off-gassing from the coating is emitted through a space between the panels created by the bump shaped protuberances. One problem with bump shaped protuberances is that it is difficult to consistently control the height of the bumps.

Another problem with laser welding panels arranged in a face-to-face relationship is that the weld may have increased porosity at the tail end of the weld. Porosity in the weld is unacceptable if the porosity affects more than a specific length of the weld. Laser welds that replace spot welds are generally configured in a C-shape that is less than 9 mm in diameter and have a curved length of 25 mm. If excessive porosity is encountered, there is insufficient space for extending the length of the C-shaped weld.

This disclosure is directed to solving the problems of facilitating off-gassing coatings and assuring weld quality by reducing weld porosity, and other problems relating to laser welding.

SUMMARY

According to one aspect of this disclosure, a method is disclosed for welding a first and second part together. A spacer bead is first formed on the first part by directing a laser beam on one side of the first part. The second part is then assembled to the one side of the first part. The second part is then welded to the first part by directing a second laser beam in a partial circular pattern adjacent the spacer bead and forming an end portion of a weld terminating radially inside the partially circular pattern.

According to another aspect of this disclosure, the method may further comprise providing a coating on at least one of the first and second parts that is between the first and second parts when assembled together in the assembling step and off-gassing the coating from between the first and second parts that are separated by the spacer bead.

The step of forming a spacer bead may be performed by directing the first laser beam toward spaced locations on the one side to form a plurality of spaced raised areas. The step of welding the second part to the first part may be performed by directing the second laser beam in a partial circular path outside the spaced raised areas with the end portion being formed inside the partial circular path.

The step of forming a spacer bead may be performed by directing the first laser beam in a C-shaped path to form a C-shaped bead. The step of welding the second part to the first part may be performed by directing the second laser beam in a partial circular path outside the C-shaped bead with the end portion being formed inside the C-shaped bead.

The step of forming a spacer bead may be performed by directing the first laser beam in a first C-shaped path to form a first C-shaped bead and by directing the first laser in a second C-shaped path radially outside the first C-shaped path to form a second C-shaped bead. The step of welding the second part to the first part may be performed by directing the second laser beam in a partial circular path between the first and second the C-shaped beads with the end portion being formed inside the first C-shaped bead.

According to another aspect of this disclosure, a weld is disclosed that joins together first and second parts. The weld includes a spacer bead integrally formed on one side of the first part and a weld bead connecting the second part to the first part. The weld bead includes a partially circular shaped weld portion partially encircling the spacer bead and an end portion of the weld that terminates radially inside the partially circular shaped weld portion.

The spacer bead may include a plurality of spaced raised areas and the partially circular shaped weld portion may extend around the spaced raised areas with the end portion extending radially inside the partially circular weld portion.

The spacer bead may be a C-shaped bead and the partially circular shaped weld portion may extend around the C-shaped bead with the end portion extending radially inside the C-shaped bead.

The spacer bead may be a first C-shaped bead. A second C-shaped bead may be provided that is disposed radially outside and concentric with the first C-shaped bead. The partially circular shaped weld portion may be disposed between the inner and outer C-shaped beads and the weld end portion may extend radially inside the first C-shaped bead.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
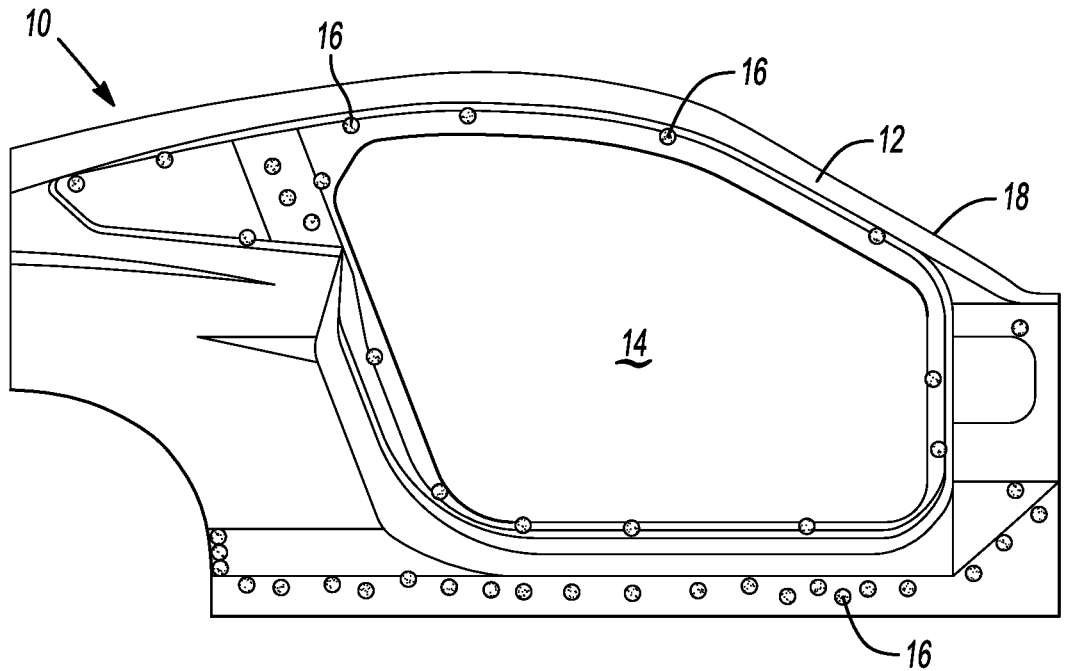
FIG. 1 is a side elevation view of a vehicle door frame showing weld locations on the assembly.

Referring to FIG. 1, a vehicle 10 is shown in part to illustrate a door frame 12 that defines a door opening 14 of the vehicle. A plurality of weld locations 16 used to assemble the door frame 12 is shown as an example. Part of the door frame is commonly referred to as the "A-pillar" 18.

Figure 2:
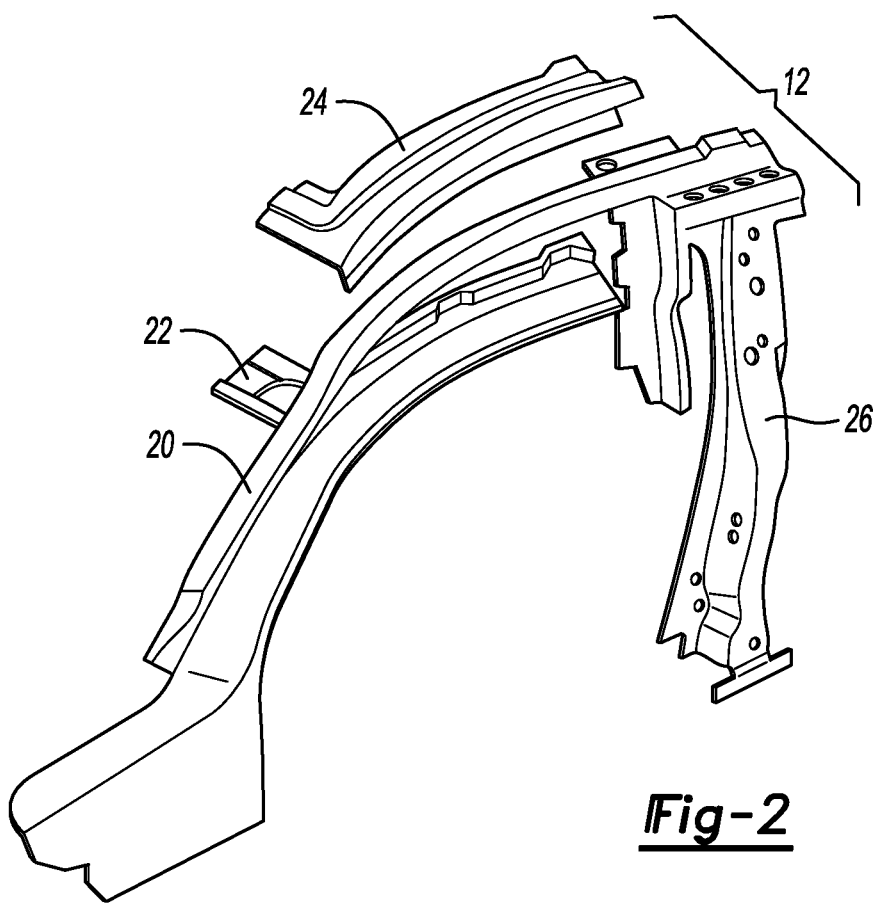
FIG. 2 is an exploded perspective view of the vehicle door frame assembly.

Referring to FIG. 2, parts of the door frame 12 are shown in an exploded view to better illustrate the component parts of the door frame 12. A hydro-formed tube front rail 20 reinforces the A-pillar (shown in FIG. 1). Other parts of the A-pillar 18 include a roof rail header panel 22 and a windshield header panel 24. The hydro-formed tubular front rail 20 extends to the "B-pillar" 26.

Figure 3:
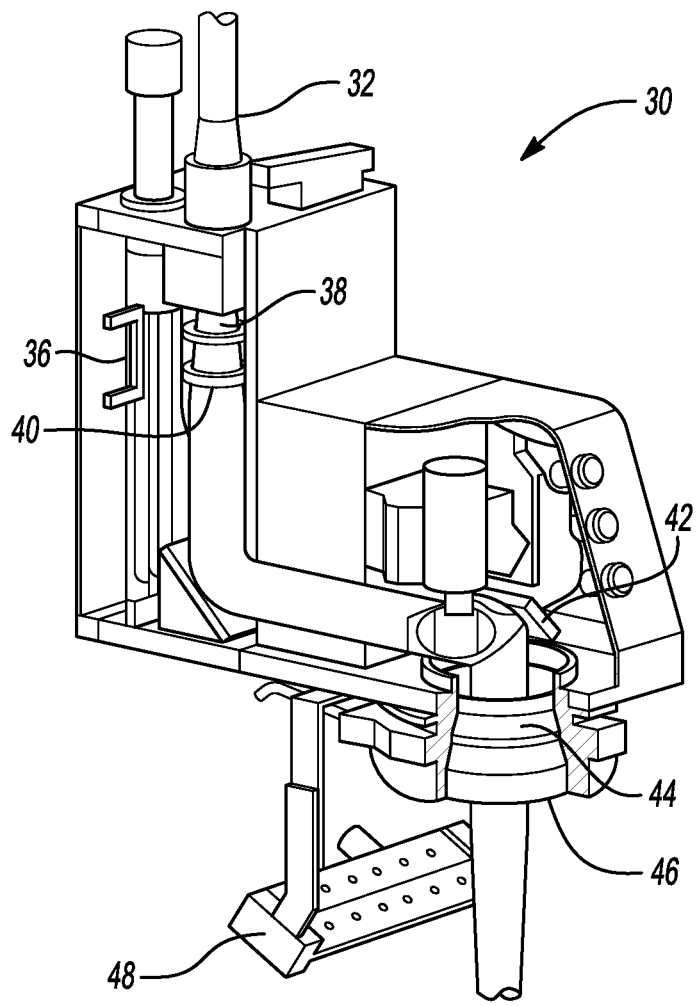
FIG. 3 is a diagrammatic partial cross-section view of a remote laser welding tool.

Referring to FIG. 3, a remote laser head 30 is shown that may be used to form laser welds on the vehicle 10. Laser light is received through a laser light cable receiver 32 from a remote location. A plurality of pointer diodes 36 is provided to direct the laser light beam. A cover slide 38 is provided for collimation of the laser light beam. Adjustments of the laser beam in the Z direction (vertical) are made by a Z variation linear motor 40. X and Y scanner mirrors 42 are provided to control movement of the laser beam in the X and Y directions. A focusing lens 44 focuses the laser on the object to be welded. A focusing optic cover slide 46 is provided to cover the focusing lens 44. A cross-jet 48 is used to direct a flow of air across the laser light beam to eliminate any plume of smoke or gas from the path of the laser beam.

Figure 4:
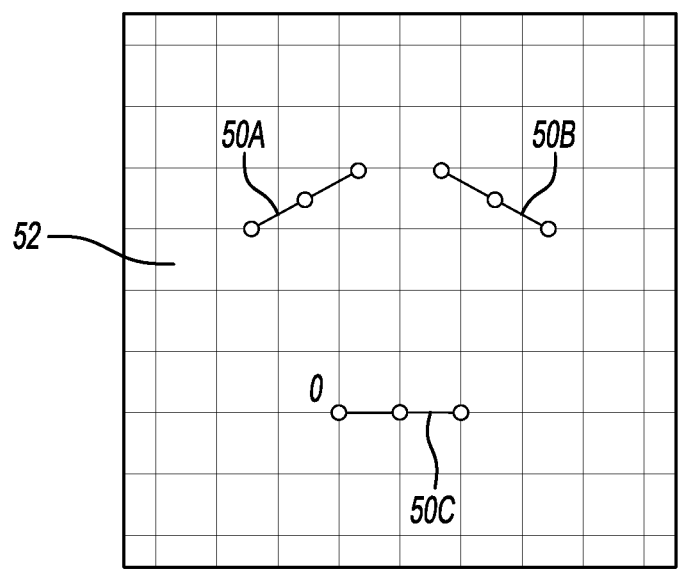
FIG. 4 is a programming diagram for forming three raised dimple spacers on a panel.

Referring to FIG. 4, laser path plots 50A, 50B and 50C are provided to show how the laser is controlled to traverse an inner surface of a panel 52. The laser path plots 50A, 50B and 50C have a length of approximately 2 mm and are arrayed as spaced partial sides of a triangular array.

Figure 5:
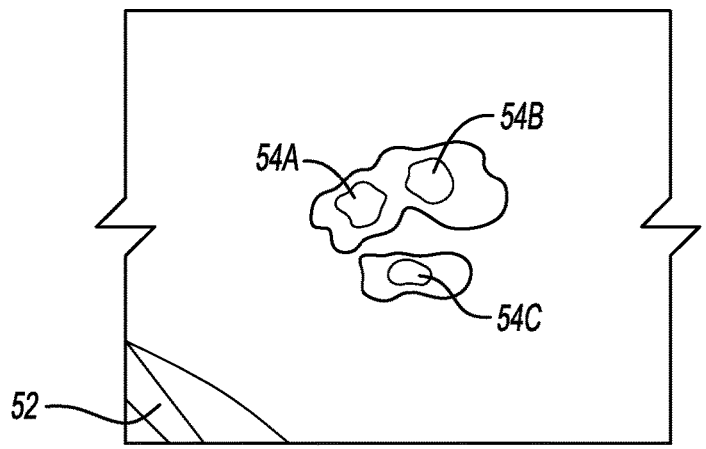
FIG. 5 is a plan view of the three raised dimple spacers formed using the programming diagram of FIG. 4.

Referring to FIG. 5, a plurality of raised dimples 54A, 54B and 54C are shown on a panel 52. The height of the raised dimple is controlled in FIG. 6.

Figure 6:
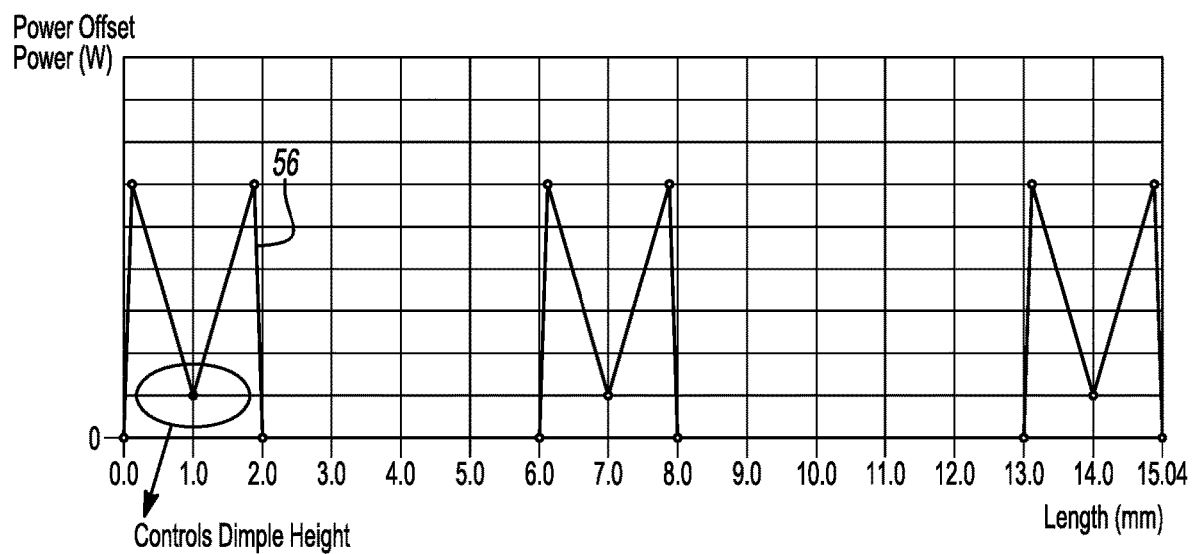
FIG. 6 is a chart showing the power in Watts of the laser output as the laser forms a 2 mm dimple on a panel.

Referring to FIG. 6, a series of power offset plot 56 is shown to illustrate how the power of the laser is controlled to form the three raised dimples 54A-54C. Each power offset plot 56 shows that the laser is initially provided with a spike of power of, for example, 6000 watts after which the power is reduced after travelling 1 mm to approximately, for example, 1000 watts. In the second millimeter, the power of the laser output increases again to, for example, 6000 watts until it reaches a peak whereupon the power output of the laser is reduced to 0 watts. This process is repeated three times to provide the three raised dimples 54A-54C that have a controlled height.

Figure 7:
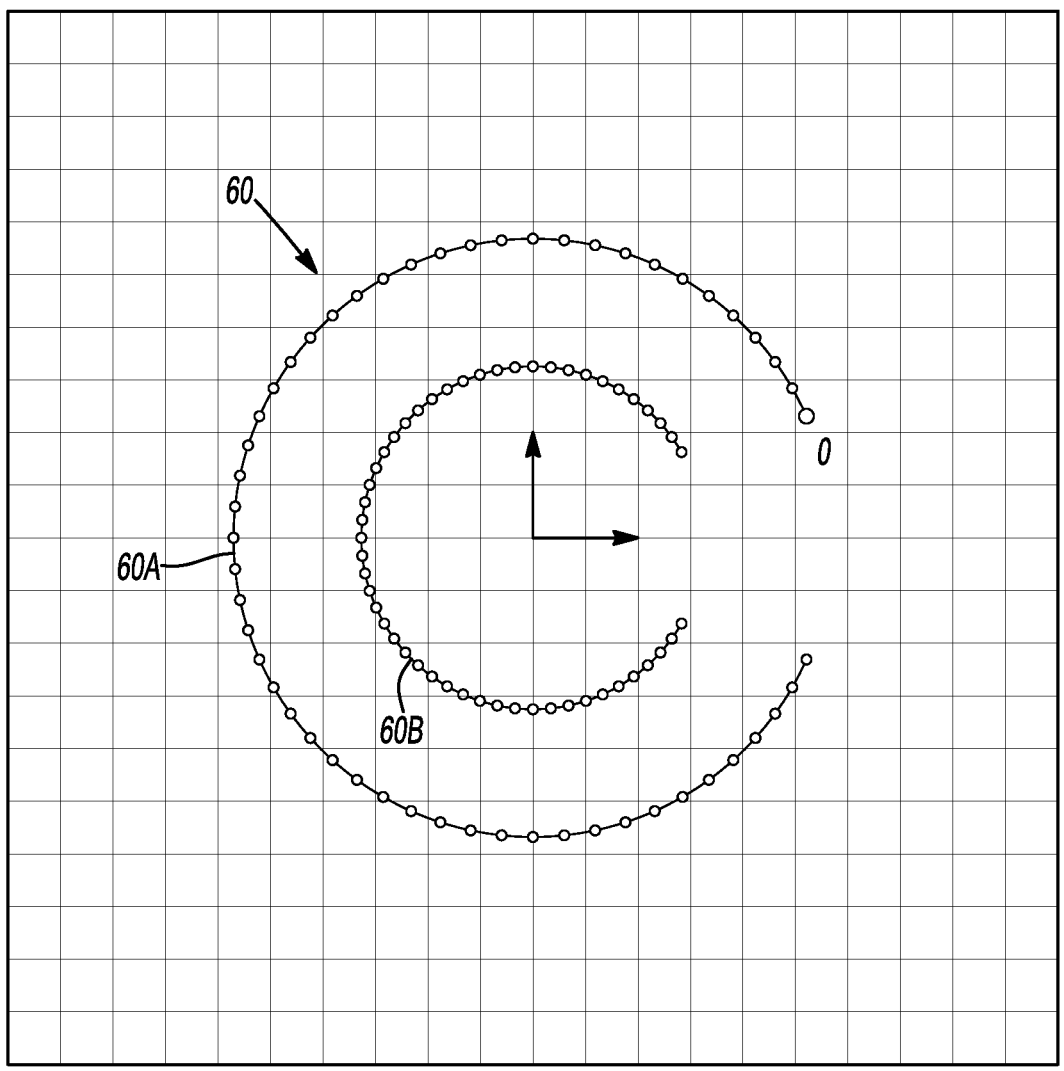
FIG. 7 is a programming diagram for forming an inner and an outer C-shaped spacer on a panel.

Referring to FIG. 7, a laser path plot for forming an inner and outer C-shaped spacer 60 is shown. The concentric dual C-shaped spacer path 60 is formed by initially following the outer C-shape path 60A with the laser emitting a plurality of controlled pulses. The laser path plot 60A is initiated at the top end of the outer C and moves in a counter-clockwise direction until it reaches the lower end of the outer C. At this point, the laser beam is redirected to begin following the inner C-shape path 60B at the top end of the inner C and rotates in a counter-clockwise direction until it reaches the lower end of the inner C. When panels having the dual C-shaped spacer 62 (shown in FIG. 8) are welded together, the joining weld is formed between the outer and inner C-shaped spacers 62A and 62B.

Figure 8:
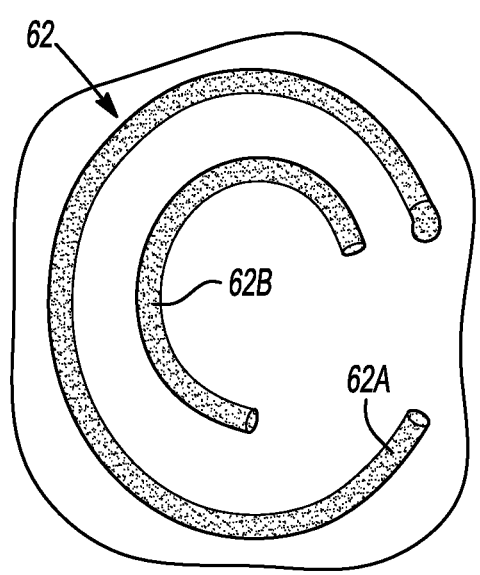
FIG. 8 is a plan view of the inner and the outer C-shaped spacer on a panel formed with the programming diagram of FIG. 7.

Referring to FIG. 8, a dual C-shaped spacer 62 is shown as it is formed on the inner surface of one of the panels to be assembled. The outer C-shaped spacer 62A and inner C-shaped spacer 62B form the dual C-shaped spacer 62.

Figure 9:
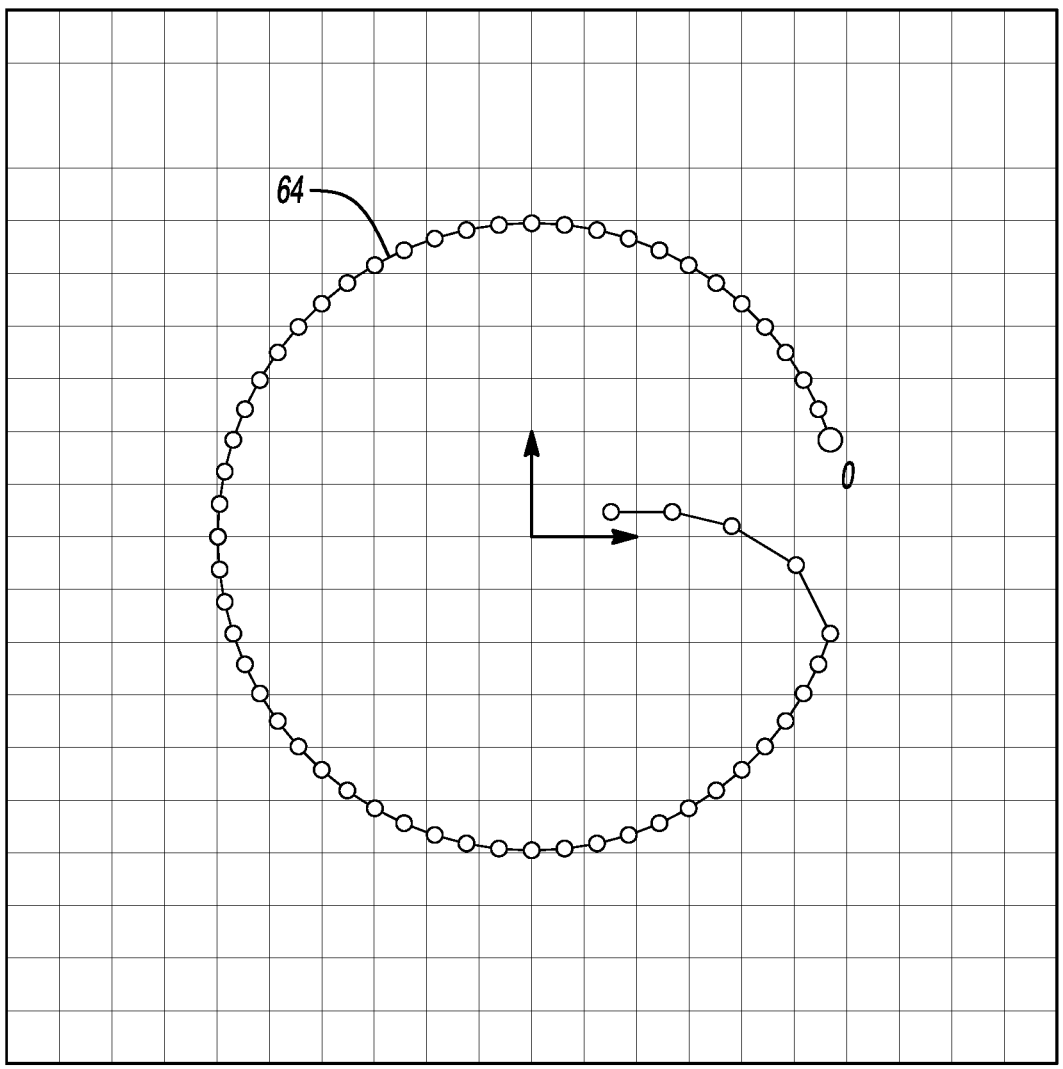
FIG. 9 is a programming diagram for a G-shaped laser weld for joining panels together to form an assembly.
Figure 10:
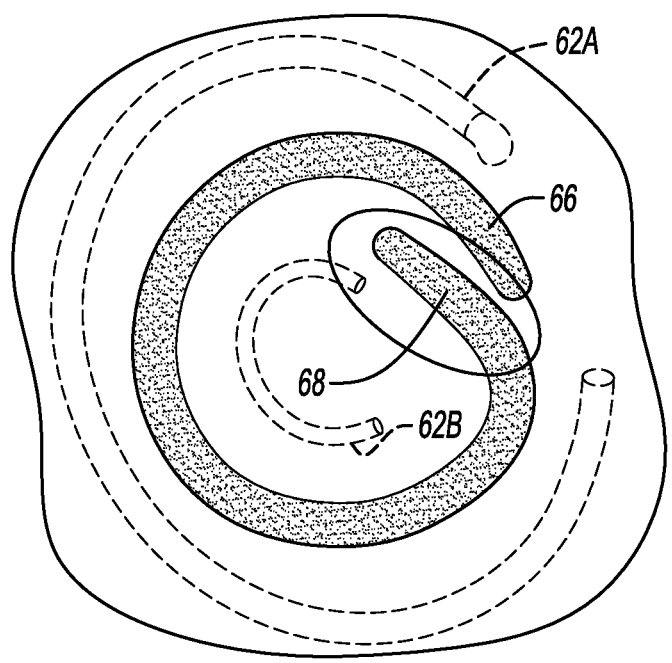
FIG. 10 is a photograph of the G-shaped laser weld on a panel formed with the programming diagram of FIG. 9.
Figure 11:
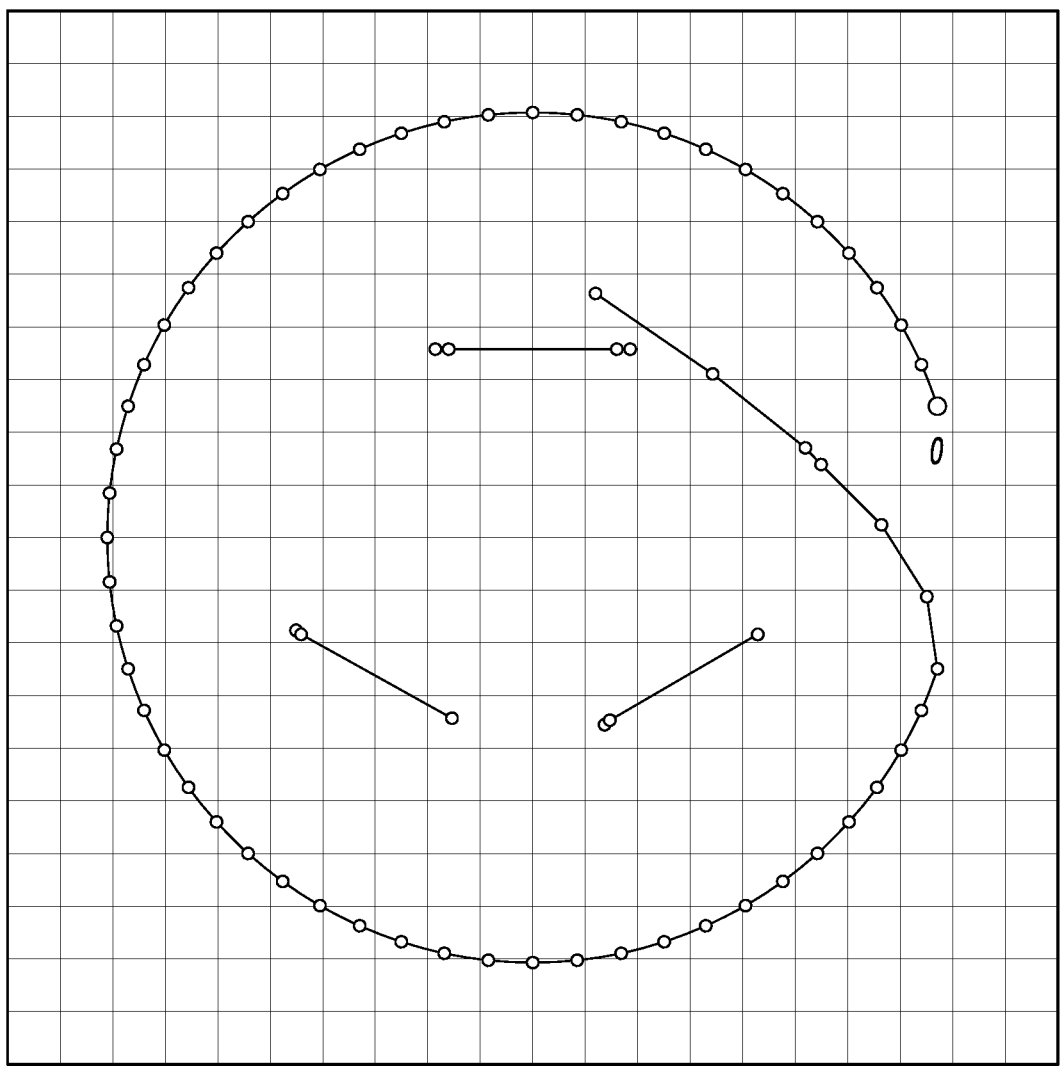
FIG. 11 is a programming diagram for a G-shaped laser weld on an outer panel overlaid on a programming diagram for forming three raised dimple spacers on an inner panel.

Referring to FIG. 9, a laser path plot 64 for forming a G-shaped laser weld 66 is illustrated. The G-shaped laser weld 66 is shown in FIG. 10 to be formed within the C-shaped spacers 62A and 62B. A tail 68 is formed on the G-shaped laser weld 66. With prior art C-shaped laser welds, the tail 68 is the last portion of the weld formed and tends to have increased porosity and weld imperfections. With the G-shaped weld 66, the end of the weld undercut is driven into the tail 68 of the G-shaped laser weld 66.

One of the problems faced by the disclosed welding process is that different materials are used in material stack-ups. For example, the outer panel is welded to the body side inner may be 0.7 mm mild hot dipped galvanized iron (HDGI). The body side inner assembly may include DP800 uncoated steel; and DP800 HDGI (galvanized high strength steel); DP1000 (uncoated high strength steel); high-strength low alloy 340 (HSLA); boron M1A37; Mart 1100 and mild hot dipped galvanized (HDG) steel.

The equipment used to provide the remote laser 30 includes a Highyag remote scanning head, a Highyag EPS that controls the laser head, a 6000 watt laser and a programmable controller.

The parameters used to control the remote laser 30 include the laser power, travel speed of the laser beam and the power ramp in/out as the raised dimple is formed and also as the G-shaped laser weld is formed. Critical factors affecting the process include plume suppression air flow to keep the path of the laser clear, controlling the dimple height and also the location of the dimples. Other factors include the part fit-up when two panels are assembled together for welding, and the focal point of the remote laser 30.

The plume is a plasma cloud emitted from the weld pool above the keyhole formed by the laser during welding. The plasma cloud absorbs laser energy and decreases the power delivered to the workpiece resulting in less penetration. The cross-jet 48 directs air or another gas to flow across the weld and shifts the plume out of the path of the laser. Plume suppression is not always necessary, however, plume suppression reduces inconsistent energy absorption and results in more consistent weld quality. Successful plume suppression results in more robust quality and penetration. A key factor to plume suppression is providing a consistent air flow from cross-jet 48.

Referring to the G-shaped laser weld 66 shown in FIG. 10, the welds 66 in one example are 9 mm in diameter and 25 mm in length. If 80% of the 25 mm weld is non-porous, the weld is determined to be acceptable. By forming a G-shaped weld, the tail of the weld is disposed within the partially circular periphery of the weld and can be lengthened to assure that 80% of the length of the weld is not porous resulting in an acceptable weld.

To provide a raised dimple spacer, an inner side of two panels to be joined is provided with one or more dimples of controlled height to allow for out-gassing of zinc gases from the galvanized coatings. To form the laser raised dimples, the laser is quickly fired to raise the surface approximately 0.1 mm to 0.15 mm. The location of the dimples relative to the subsequently formed weld that joins the two panels is critical for successful out-gassing and prevention of porosity.

Referring to forming the inner and outer C-shaped spacers 62A and 62B, this approach may be especially advantageous for materials such as galvanized HSLA340. HSLA340 is a boron material that is more volatile than other types of steel.

By following the disclosed method, a remote laser welder may be used to form welds in a fast-paced manufacturing environment. Clamping and stamping quality must be controlled to maintain a part fit-up of between 0.1 mm and 0.3 mm gap across the entire welding surface to achieve acceptable weld quality. Coated materials, such as those coated with galvanized coatings or other zinc-based coatings, requires the inclusion of raised dimples or other spacers to provide an out-gas escape route and prevent out-gassing through the molten weld. It has been found that remote laser welding can perform at least three times as many welds in a single station cycle compared to traditional resistance spot welding. Remote laser welding also allows for product design with single sided access to weld locations and eliminates structural weakness caused by back-side access holes.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of welding a first and second part, comprising:
    forming a spacer bead on the first part by directing a first laser beam on one side thereof;
    assembling the second part to the one side; and
    welding the second part to the first part by directing a second laser beam in a partial circular pattern adjacent the spacer bead and forming an end portion of a weld terminating radially inside the partial circular pattern.

2. The method of claim 1 further comprising:
    providing a coating on at least one of the first and second parts that is between the first and second parts when assembled together in the step of assembling the second part to the one side; and
    off-gassing the coating from between the first and second parts that are separated by the spacer bead.

3. The method of claim 1 wherein the step of forming a spacer bead is performed by directing the first laser beam toward spaced locations on the one side to form a plurality of spaced raised areas, and wherein the step of welding the second part to the first part is performed by directing the second laser beam in a partial circular path outside the spaced raised areas with the end portion being formed inside the partial circular pattern.

4. The method of claim 1 wherein the step of forming a spacer bead is performed by directing the first laser beam in a C-shaped path to form a C-shaped bead, and wherein the step of welding the second part to the first part is performed by directing the second laser beam in a partial circular path outside the C-shaped bead with the end portion being formed inside the C-shaped bead.

5. The method of claim 1 wherein the step of forming a spacer bead is performed by directing the first laser beam in a first C-shaped path to form a first C-shaped bead and by directing the first laser beam in a second C-shaped path radially outside the first C-shaped path to form a second C-shaped bead, and wherein the step of welding the second part to the first part is performed by directing the second laser beam in the partial circular path between the first and second C-shaped beads with the end portion being formed inside the first C-shaped bead.

\* \* \* \* \*